Patented Sept. 1, 1925.

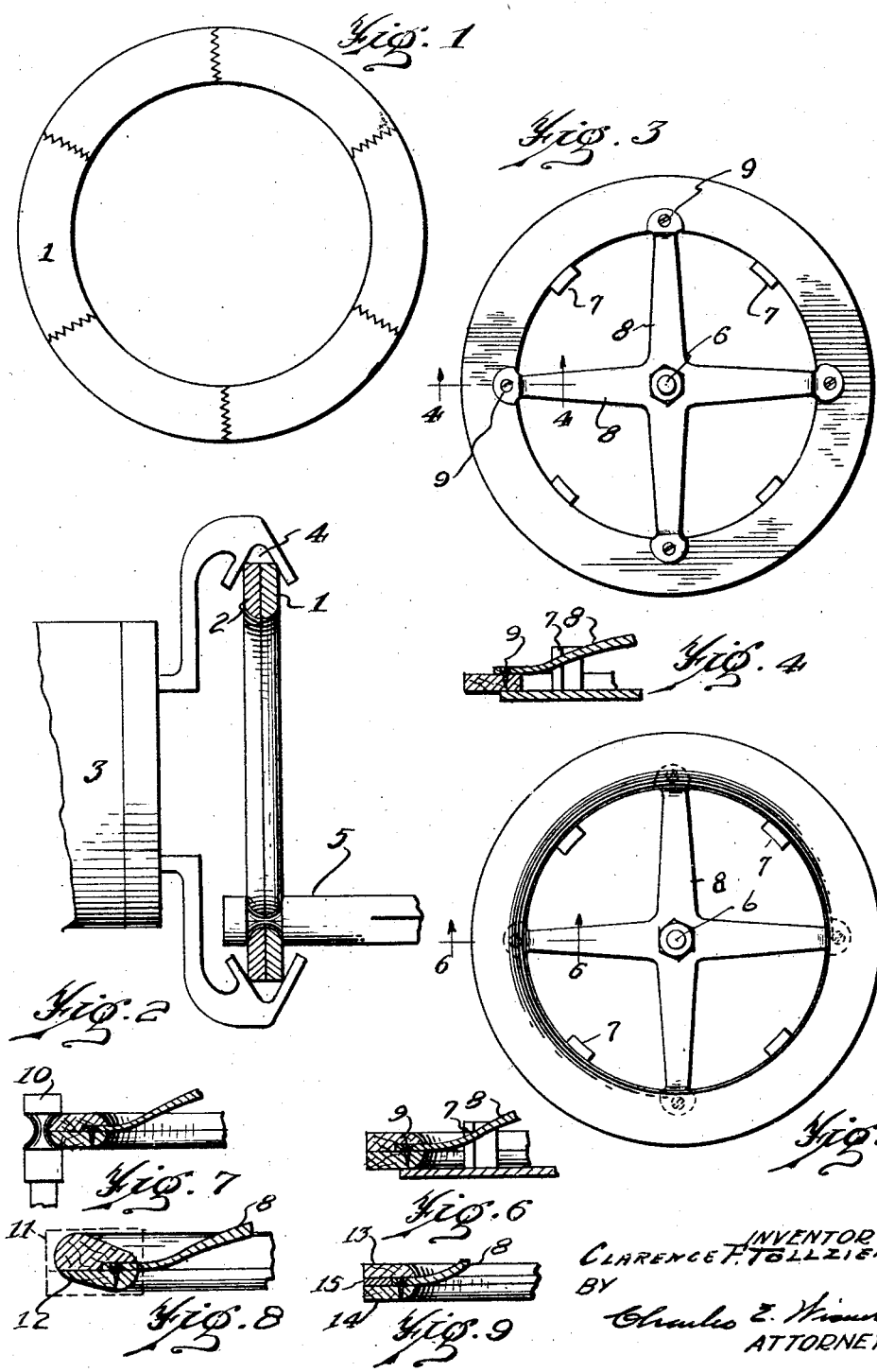

1,552,249

UNITED STATES PATENT OFFICE.

CLARENCE F. TOLLZIEN, OF DETROIT, MICHIGAN.

METHOD FOR MAKING WOOD-RIMMED WHEELS.

Application filed September 18, 1920. Serial No. 411,277.

*To all whom it may concern:*

Be it known that I, CLARENCE F. TOLL-ZIEN, a citizen of the United States, residing at Detroit, county of Wayne, State of Michigan, have invented a certain new and useful Improvement in Methods for Making Wood-Rimmed Wheels, and declare the following to be a full, clear, and exact description of the same, such as will enable others skilled in the art to which it pertains to make and use the same, reference being had to the accompanying drawings, which form a part of this specification.

The present invention relates to wood rimmed wheels and method of making the same particularly adapted to be used as steering wheels for automotive vehicles, motor boats, etc., or in fact a wheel for any particular purpose in which a spider is to be secured to a wood rim. The object of the invention is to provide a steering wheel, or wheel for other use, that is strong and durable in construction and inexpensive to manufacture. Heretofore, particularly with steering wheels, the wooden rim is first formed and is notched or recessed at several points to receive the ends of the spider arms and thereafter a wooden plug is secured over the ends of the arms and finished to conform to the surface of the rim. In such construction the plugs readily become loosened and sometimes detached from the rim and such wheels for this reason are to a certain degree shortlived. Furthermore, the cost of manufacture of the wheels thus formed is comparatively large due to the labor cost involved in forming, fitting and finally finishing the several parts. The primary object of this invention is to provide a method of manufacture of a steering wheel or other wheel provided with a spider, whereby the cost of production is reduced to a minimum and eliminating the introduction of plugs or the like heretofore utilized to cover the ends of the spider arms and to secure a wheel rim that is of great strength and uniform appearance of both the upper and lower surfaces between which the spider arm ends are positioned. In my improved construction, the rim is formed of several parts, preferably two parts, between which the spider arms are fastened and, as hereinafter shown, these parts may be duplicate in character if desired as in some types of rims or of different shape and thickness as may be required in the manufacture of other type of rims or the rim may be made of more than two parts. The various objects and novel features of construction of a wheel embodying my invention and method of manufacture thereof are hereinafter more fully described and claimed, and the preferred form of the construction of my improved wheel is shown in the accompanying drawings.

In the drawings—

Fig. 1 is a plan view of one of the several parts of which the rim is to be made.

Fig. 2 is a view partly in section and diagrammatic in character showing a means for holding the parts together during the finishing of the interior thereof.

Fig. 3 is a plan view indicating the general manner of attachment of the spider thereto with the axis of the spider coinciding with that of the rim.

Fig. 4 is a section through the rim and end of the spider arm taken on line 4—4 of Fig. 3.

Fig. 5 is a view similar to Fig. 3 showing the wheel subsequent to placing the other part of the rim over the ends of the spider arms and centered relative to the center of the spider.

Fig. 6 is a section taken on line 6—6 of Fig. 5.

Fig. 7 is a section showing diagrammatically the finishing of the outer periphery of the rim.

Fig. 8 is a section showing a rim formed of non-uniform parts.

Fig. 9 is a section showing a rim formed of three parts.

The wheel rim is preferably a built up rim formed of several parts, the drawing showing the rim as being formed of two duplicate parts, but it is to be understood that the rim may be formed of more than two parts and that the said parts even if but two be used may not be duplicate in character although preferably for facility in handling during the process of manufacture I form the rim of two duplicate parts.

I preferably form the rim parts of a plurality of short arcuate members having complementally notched ends permitting the same to be assembled end to end, as shown in Fig. 1, to form a complete circle, and these ends are glued together and pressed to place in any approved way. By making the rim parts of short lengths a rim of great strength is secured as each part of the rim has the grain of the wood running practically from end to end and the strain imposed on the wheel in use is always transversely of the grain and no portion of the wheel is so positioned that a breaking strain in ordinary use may be imposed thereon parallel to the grain tending to split the rim.

These several pieces of each rim part are made from flat stock of the desired thickness and in the structure shown in Fig. 2 two similar rings 1 and 2 of the character shown in Fig. 1, are placed in the chuck diagrammatically illustrated at 3 in Fig. 2 having several arms terminating in the internal V shaped ends 4. These arms, of which there may be three or more, subsequent to the placing of the rings, are drawn together which, due to the V shape, rigidly clamps the parts 1 and 2 together. The head or chuck 3 is revoluble and any ordinary machine having a revoluble head may be utilized for this purpose.

The rings when placed in the machine are unfinished, as shown at the upper end of the Fig. 2, being practically rectangular in form in cross section and by clamping these rim parts together from the outside as shown, the interior of the temporarily assembled ring like members may be readily operated upon by means of any desired type of cutting tool as for instance a revoluble cutter 5 shaped to give the desired shape to the inner periphery of the rings. In the mechanism shown, the ring is revoluble in a direction the reverse of that of the revolution of the cutter head 5 but a stationary cutter may be employed if so desired and in this operation it is to be understood that the inner periphery of the rim members are finished while the outer periphery and a portion of the sides of the rim members remain in an unfinished condition. If these rim members are duplicates in size, the rim parts after passing through the operation shown in Fig. 2, may be indiscriminately used for the next step of the operation but if not duplicate in character the rim parts should be placed or stored with the corresponding members.

Subsequent to the operation indicated in Fig. 2 the rings, the inner peripheries of which have been finished, are ready for the succeeding operation indicated in Fig. 3. In this step of the operation a table is provided with a rod 6 and several blocks placed thereabout, the outer surfaces of which are a radial distance from the rod equal to the radius of the interiorly finished ring. Thus, the ring on being placed about the block 7 is centralized as to the rod 6 which passes through the axis of the ring. On this rod is then placed a spider having several arms 8 with the apertured ends 9 here shown as being somewhat greater in width than the arm proper but which may be of the same width if so desired. Preferably, these arm ends are semi-circular in contour and screws are inserted in the apertured ends 9 attaching the spider firmly to the ring as indicated in Fig. 4.

The blocks 7 are all of a height at least equal to the thickness of the combined rim parts and after the spider is secured to the first rim member a second rim member is placed thereover, and thus centered relative to the rod 6 and spider hub and the position of the ends of the spider arms marked thereon. This second marked rim part is then notched or recessed at the points marked to a depth and size equal to that of the arm ends and then again placed over the spider and attached rim and glued in place. This operation will be understood from Fig. 6 in which it will be seen that the ends of the spider arms are inserted between the two parts of the rim.

The built up wheel rim and attached spider now have the inner periphery of the rim member finished and the spider attached in final position and the external periphery of the rim members are still in an unfinished state. Subsequent to the operation indicated in Figs. 3, 4, 5 and 6, the wheel is ready for the final finishing operation indicated diagrammatically in Fig. 7 and for this operation the wheel is secured to a revolving head and subjected to a cutter of the desired character and form indicated at 10 which finishes the outer periphery of the rim. Preferably, this cutter is of a form to extend about the rim member to finish the same uniformly with the finishing operation of the inner periphery indicated in Fig. 2 and for this purpose a revolving cutter may be used having the desired shape or a stationary cutter may be used that may be turned about the wheel rim to operate upon the sides as well as the periphery of the members.

As heretofore stated the rim parts may be duplicate in character as above described or otherwise if desired. One instance in which a rim may be formed of parts, one of which is of less thickness than the other, is shown in Fig. 8, in which the finished rim section is oval in character with the line passing through the two foci of the oval occupying a plane at an angle to the plane of the rim. In the manufacture of such a rim, one part 11 is necessarily of greater thickness than the other part 12 but the method of manufacture is identical with that described above where duplicate rim parts are utilized. An instance of use of three ring like parts in the manufacture of the rim is shown in Fig. 9 in which the two outer parts 13 and 14 may be duplicate in character and the intermediate part 15 may be of a thickness just equal to that of the arm end of the spider. In this case the three parts are clamped together and finished in the interior in the same manner as shown in Fig. 2, the part 14 thereafter having the spider attached thereto in the manner shown in Fig. 3, the intermediate part notched and fitted about the arm ends, and the third part 13 positioned and the several parts glued together and finally finished after the manner shown in Fig. 7.

The method described permits of a great saving in the cost of manufacture of the steering wheels, it being possible to manufacture a steering wheel for approximately half of the cost by former well known methods of manufacture of similar wheels. It is further evident from the foregoing description that the process may be varied somewhat without departing from the spirit of this invention. For instance, the several ring like members may be temporarily held as shown in Fig. 2 and finished on the interior and then temporarily held from the interior after the same general method, by means of arms adapted to engage the interior of the rings and adapted to be forced outward to securely hold the parts, and then finished on the exterior. Thereafter the spider may be attached to one of the members and the several members secured together in final relationship. Also, while I have shown a spider having the arm ends attached to the wood rim, the said spider may be of the well known character formed with a continuous metal ring connecting the arm ends, which ring may be inserted in an annular recess formed in one of the ring like parts and covered by the other (where but two parts are used) after the general manner described. The character of the finished inner surface of the ring parts may also be varied. That is, instead of being half round in cross section as shown it may be of other forms or may be corrugated as with other wheels now commonly in use. The particular feature of the invention resides in the temporary assembly of the ring like parts, the finishing of the said parts while temporarily held, and the attachment of the spider between the several parts in final permanent assembly, or the ring parts while temporarily held may be finished on the inner periphery only, the spider then attached to one part, the several parts then permanently secured in final relationship, and then finally finishing the outer periphery.

What I claim is—

1. The method of forming a wheel of a wood rim and an attached spider consisting first, in the formation of two ring like parts both greater in width than the width of the finished rim and each having a finished surface, temporarily holding the two parts together from the exterior in their final relationship, then finishing the inner periphery of the rings to the desired final shape and diameter, attaching the ends of the spider arms to one of the parts, gluing the other of the said parts thereto covering the arm ends, there being notches provided to receive the arm ends, and then finally finishing the remaining external surface of the ring parts in the desired continuity with the finished inner periphery.

2. The method of making a steering wheel consisting in forming two ring-like parts, temporarily clamping said parts together so that their inner peripheries are clear, shaping the inner peripheries of said parts to the desired finished contour while so clamped, then attaching a spider to said parts with the ends of its arms between the parts and attaching the parts together, and then shaping the outer periphery of the parts to the desired finished contour.

3. The method of forming a wheel of a wood rim and an attached spider which consists first in the formation of a number of ring like parts adapted to be assembled together side by side, each rim part being formed of short practically straight grain sections arcuate in form and secured together in end to end relationship, then assembling the said rim parts together in side by side relationship and temporarily holding the same from the exterior surface, shaping the inner peripheries to the desired finished contour, mounting the said parts together upon a spider in their final relationship, and finally turning the outer periphery to the desired finished contour.

4. The method of making a steering wheel consisting in forming two ring-like parts, temporarily clamping said parts together, shaping the inner peripheries of said parts to the desired finished contour while so clamped, then mounting the parts upon a spider, and then turning the outer periphery of the parts to the desired finished contour.

In testimony whereof, I sign this specification.

CLARENCE F. TOLLZIEN.